(12) United States Patent
Bleicher et al.

(10) Patent No.: US 7,740,086 B2
(45) Date of Patent: Jun. 22, 2010

(54) SUCTION DEVICE FOR A PICK POWER TOOL

(75) Inventors: Jochen Bleicher, Penzing (DE); Oliver Ohlendorf, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 530 days.

(21) Appl. No.: 11/800,486

(22) Filed: May 3, 2007

(65) Prior Publication Data

US 2007/0264091 A1 Nov. 15, 2007

(30) Foreign Application Priority Data

May 8, 2006 (DE) ............... 10 2006 000 212

(51) Int. Cl.
*B23B 27/10* (2006.01)
(52) U.S. Cl. .................. 173/198; 173/75; 173/78; 173/199
(58) Field of Classification Search ........ 173/198, 173/75, 78, 199
See application file for complete search history.

(56) References Cited

U.S. PATENT DOCUMENTS

| | | | |
|---|---|---|---|
| 2,437,668 A * | 3/1948 | Adams | 408/67 |
| 3,850,254 A * | 11/1974 | Hirdes | 173/75 |
| 3,936,213 A * | 2/1976 | Kappel | 408/67 |
| 4,101,238 A * | 7/1978 | Reibetanz et al. | 408/59 |
| 4,209,069 A * | 6/1980 | Smith | 173/75 |
| 4,361,957 A * | 12/1982 | Krotz et al. | 30/124 |
| 4,547,928 A * | 10/1985 | Ludscheidt | 15/364 |
| 4,921,375 A * | 5/1990 | Famulari | 408/67 |
| 5,090,499 A * | 2/1992 | Cuneo | 175/209 |
| 5,199,501 A * | 4/1993 | Kluber et al. | 173/75 |
| 5,467,835 A * | 11/1995 | Obermeier et al. | 175/209 |
| 5,772,367 A * | 6/1998 | Daniel | 408/67 |
| 6,086,292 A * | 7/2000 | Yokoyama | 408/67 |
| 6,615,930 B2 * | 9/2003 | Bongers-Ambrosius et al. | 173/198 |
| 6,830,113 B2 * | 12/2004 | Moore et al. | 173/198 |
| 7,354,226 B2 * | 4/2008 | Britz | 408/67 |
| 7,425,109 B2 * | 9/2008 | Simm et al. | 408/67 |
| 7,475,739 B2 * | 1/2009 | Wuensch | 173/168 |
| 2004/0011543 A1 * | 1/2004 | Moore et al. | 173/198 |
| 2005/0019122 A1 | 1/2005 | Kado et al. | |
| 2006/0153650 A1 * | 7/2006 | Simm et al. | 408/58 |
| 2007/0193759 A1 * | 8/2007 | Sweig et al. | 173/198 |
| 2008/0240877 A1 * | 10/2008 | Kirby | 408/58 |
| 2009/0148246 A1 * | 6/2009 | Nishikawa et al. | 408/58 |

FOREIGN PATENT DOCUMENTS

| | | |
|---|---|---|
| DE | 3734127 | 4/1989 |
| ES | 1032686 | 6/1996 |
| FR | 2383740 | 10/1978 |
| GB | 2189593 | 10/1987 |

\* cited by examiner

*Primary Examiner*—Brian D Nash
(74) *Attorney, Agent, or Firm*—Abelman, Frayne & Schwab

(57) ABSTRACT

A suction device (11) for a hammer drill (6) has a first end (12) with a securing device (14) for securing the suction device (11) to the hammer drill (6) and a second end (13) opposite first end (12) and which has a contact area (15) with which the suction device (11) contacts a constructional component, the suction device (11) further having a receiving space (20) which at least partially encloses a working tool (7) of the pick power tool (6), and being provided with a connection device (18) for a vacuum source. A retaining element (21) having a through-opening (22) for the working tool (7) and a plurality of suction openings (23) is provided in an area (19) of the second end (13).

6 Claims, 4 Drawing Sheets

SUCTION DEVICE FOR A PICK POWER TOOL

BACKGROUND OF THE INVENTION

1. Field of the Invention

The invention is directed to a suction device for a pick power tool including a suction device for a pick power tool, comprising a receiving space which at least partially encloses a working tool of the pick power tool, a securing device provided at a first end of the suction device for securing the suction device to the pick power tool, a contact area provided at a second end of the suction device opposite the first end for contacting a constructional component, a connection device for a vacuum source.

2. Description of the Prior Art

When a mineral constructional component such as, for example, a concrete wall or concrete floor is worked by a working tool of a pick power tool such as a drill hammer, combi-hammer or chisel hammer, pieces of the broken material and dust occur. The dust particles, in particular, lead to a contamination of the environment, e.g., of interior spaces of a building, and impede the work of the user.

For this reason, DE 81 19 612 U proposes a suction device for an electric hand-held drilling power tool which has a first end and has a second end which is arranged opposite from the first end. The suction device has a receiving space which at least partially encloses the working tool of the power tool. A securing device for securing the suction device to the power tool is provided at the first end of the suction device. At the second end of the suction device, the suction device has a contact area with which the suction device contacts a constructional component. Further, the suction device has a flexible portion whose longitudinal extension may be reduced parallel to the longitudinal extension of the working tool. In addition, this suction device is provided with a connection device for a vacuum source.

In order to work the constructional component, the contact area of the suction device is brought into contact with the constructional component and the dust brought about by drilling as well as pieces of the drilled material are aspirated by the vacuum source, e.g., in the form of an industrial vacuum cleaner. The flexible portion ensures that the suction device contacts the constructional component even when the working process is underway and the working tool has penetrated into the constructional component.

A drawback in the known solution consists in that larger pieces of the broken material are also aspirated, dependent on the suction flow generated by the vacuum source, and a suction channel created by the connection device and the suction line to the vacuum source can be clogged. In combi-hammers or chisel hammers which have, e.g., a pointed chisel as a working tool, many pieces of the broken material in various sizes also occur in addition to the dust particles to be removed.

It is the object of the invention to provide a suction device which substantially avoids loading the environment with dust during the working of the constructional component and in which the suction lines are not clogged.

SUMMARY OF THE INVENTION

This and other objects of the present invention, which will become apparent hereinafter, are achieved by providing, in the suction device, at least one retaining element having a through-opening for the working tool, and at least one suction opening in an area of the second end of the suction device.

The through-opening for the working tool forms a guide for the suction device and prevents kinking in the latter in spite of the flexible portion of the suction device. Depending on the shape and number of the well-defined suction openings, the suction flow can be influenced and, therefore, controlled during aspiration as well as within the suction chamber of the suction device, which leads to an improved suction, particularly of the occurring dust particles, in the different working positions of the suction device. Due to the design of the at least one suction opening, the maximum size of the aspirated pieces of the removed material is limited, which prevents clogging of the suction channels. The retaining element forms a diaphragm which prevents large pieces of removed material from being aspirated into the suction device. The retaining element is advantageously made of a permanently elastic material.

When the suction device has a flexible portion and the retaining element is advantageously arranged at this flexible portion, the retaining element is made from a material similar to or identical to the material of the flexible portion of the suction device.

The securing device advantageously releasably secures the suction device to the pick power tool and for this purpose has, for example, a clamping element which makes it possible to secure the suction device to a portion of the housing or to the working tool holder of the pick power tool.

The retaining element preferably has a plurality of segments extending from an outer circumference of the suction device to the through-opening for the working tool. The segments are arranged at a distance from one another so as to form the at least one well-defined suction opening. The material thickness of the segments and the distance of the segments from one another are chosen in accordance with the intended use of this suction device. This retaining element is distinguished in particular by its robust construction. When the segments have free ends facing the through-opening, for example, hey can, if required, swivel inward and return to their initial position again automatically.

The segments are preferably oriented at an angle to a plane by the second end of the suction device and extend from the second end of the flexible portion in direction of the first end of the suction device. Accordingly, the second end of the suction device which comes into contact with the constructional component forms a concave antechamber in which pieces of removed material which are too large to pass through the at least one suction opening can be collected.

The segments are preferably trapezoidal in outline and are constructed so as to taper in direction of the through-opening so that an advantageous flow can be ensured.

The retaining element is preferably formed by a wall portion which has the through-opening for the working tool and which has the at least one well-defined suction opening, the latter being circumferentially closed. The wall portion closes the suction device in the area of the second end and, by a corresponding construction of the through-opening, ensures the guidance of the suction device along the working tool and a sufficient suction of the occurring dust and pieces of removed material through the at least one suction opening.

The at least one suction opening preferably has a substantially circular cross section so that the size of the particles aspirated to the suction device can be controlled in an advantageous manner.

The retaining element is preferably formed by a grating portion which has the through-opening for the working tool and whose meshes form the suction openings. The grating portion covers the area of the second end and, by a corresponding construction of the through-opening, ensures the guidance of the suction device along the working tool and a sufficient suction of the occurring dust and pieces of removed material through the suction openings.

The retaining element preferably has a plurality of ribs which are spaced apart from one another and extend from an outer circumference of the suction device to the through-opening for the working tool. Each of the ribs has a contact edge by which the suction device contacts the constructional component. The contact edges lie in a plane. Wall portions are advantageously provided between the ribs and are arranged at an angle to the plane formed by the contact edges for forming a concave antechamber. The ribs are highly rigid in direction of the working tool axis so as to prevent any suction of the wall portions at the constructional component and so that the suction flow is not interrupted during operation.

The at least one suction opening preferably has a minimum cross-sectional extension of greater than 2 mm, so that the flow can be guided in an advantageous manner when an industrial vacuum cleaner is used as a vacuum source.

The at least one suction opening preferably has a maximum cross-sectional extension of less than 30 mm so that larger pieces of removed material are not aspirated and, with a corresponding construction of the cross section of the suction lines, clogging the suction lines is prevented. When a suction line with a larger cross-section is provided and the used vacuum source has a sufficient suction power, the maximum cross-sectional extension of the at least one suction opening can also be larger.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

In the drawings.

Identical parts are basically provided with identical reference numbers in the drawings.

DETAILED DESCRIPTION OF THE PREFERRED EMBODIMENT

Figure 1:
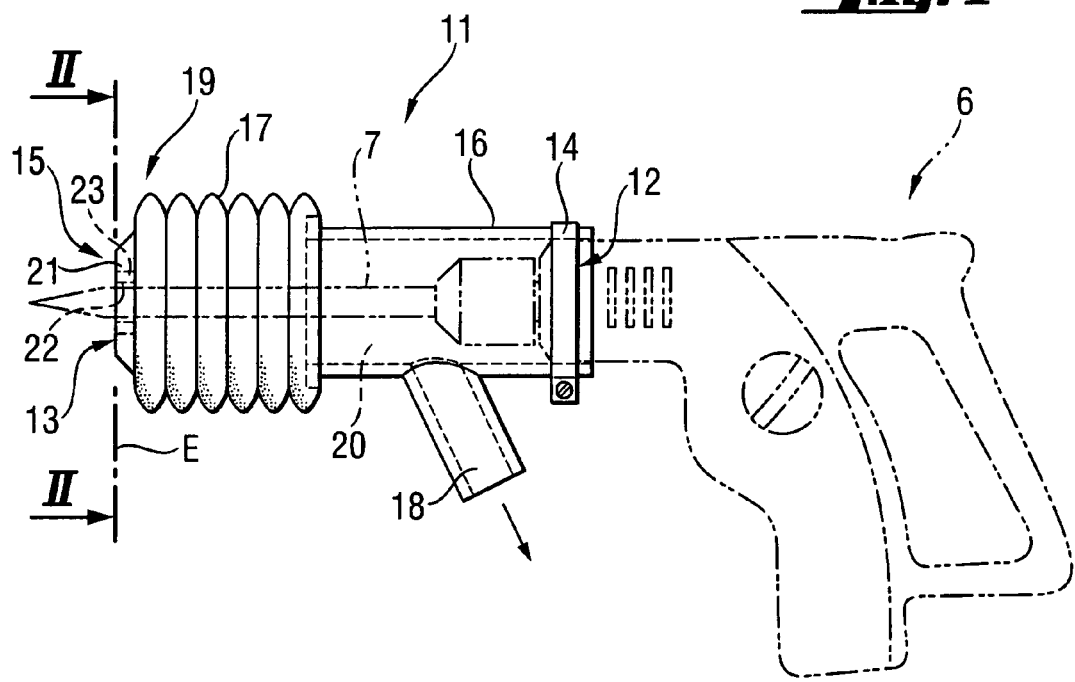
FIG. 1 shows a side view of a pick power tool with a suction device according to the invention.
Figure 2:
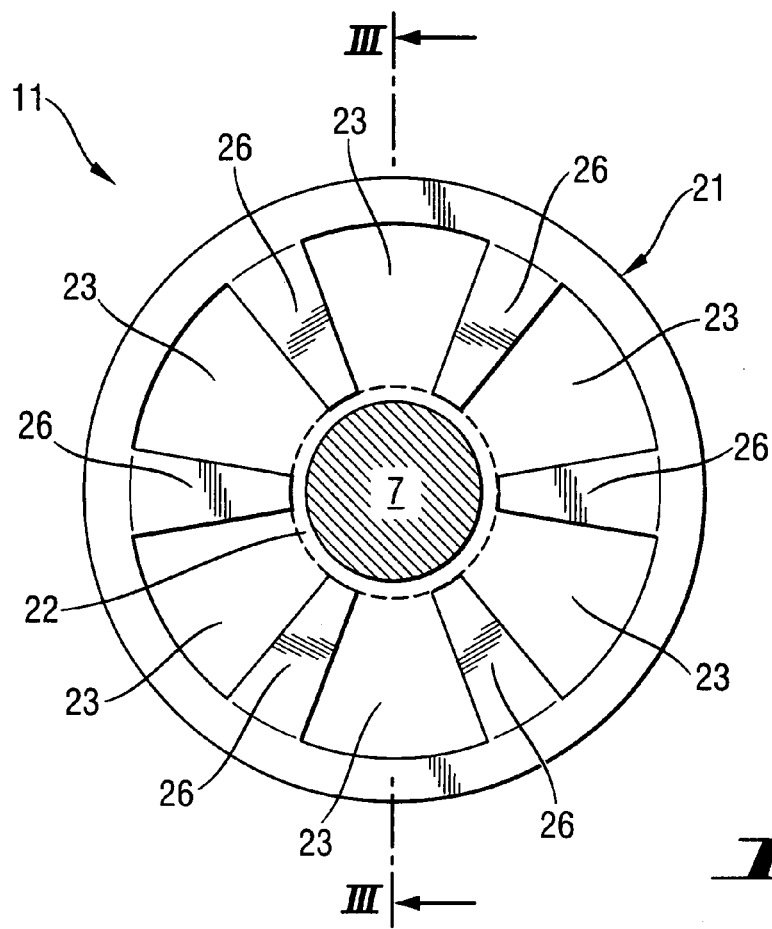
FIG. 2 shows a cross-sectional view of a first embodiment of the suction device along line II-II in FIG. 1.
Figure 3:
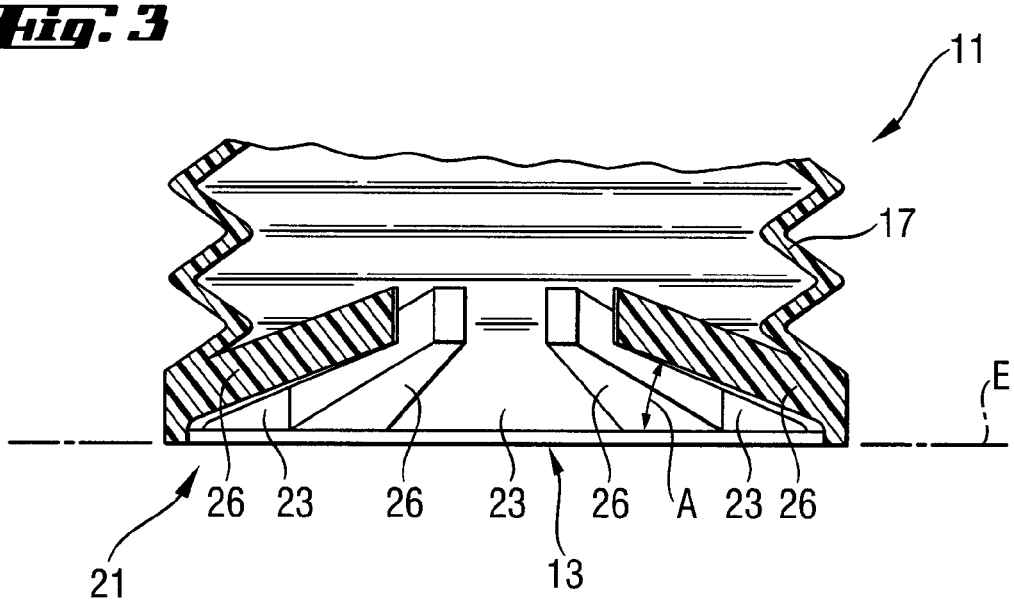
FIG. 3 shows a cross-sectional view along line III-III in FIG. 2.

The suction device 11 shown in FIGS. 1 to 3 is arranged at a pick power tool 6 formed as a combi-hammer. A securing device 14 in the form of a collar band for detachably securing the suction device 11 to the pick power tool 6 is provided at a first end 12 of the suction device 11. At its second end 13, the suction device 11 has a contact area 15 with which the suction device 11 contacts a constructional component. The suction device 11 has a rigid portion 16 which extends from the first end 12 in direction of the second end 13, and a flexible portion 17 which extends from the rigid portion 16 to the second end 13 of the suction device 11 and which can be reduced in a longitudinal direction parallel to the longitudinal extension of the working tool 7. The rigid portion 16 and the flexible portion 17 form a receiving space 20 which partially encloses a working tool 7 arranged in the pick power tool 6. A connection piece for a vacuum source, not shown, is provided at the rigid portion 16 of the suction device 11 in form of a connection element 18. A retaining element 21 has a through-opening 22 for the working tool 7 and a plurality of suction openings 23 provided in an area 19 of the second end 13 of the suction device 11 in form of a diaphragm.

The retaining element 21 has a plurality of segments 26 extending from an outer circumference of the suction device 11 to the through-opening 22 for the working tool 7. The segments 26 are arranged so as to be spaced apart to form the suction openings 23. Further, the segments 26 have a trapezoidal shape in outline and taper in direction of the through-opening 22. The segments 26 are oriented at an angle A to a plane E that is by the second end 13 of the suction device 11, and extend from the second end 13 of the suction device 11 in direction of the first end 12 of the suction device.

Figure 4:
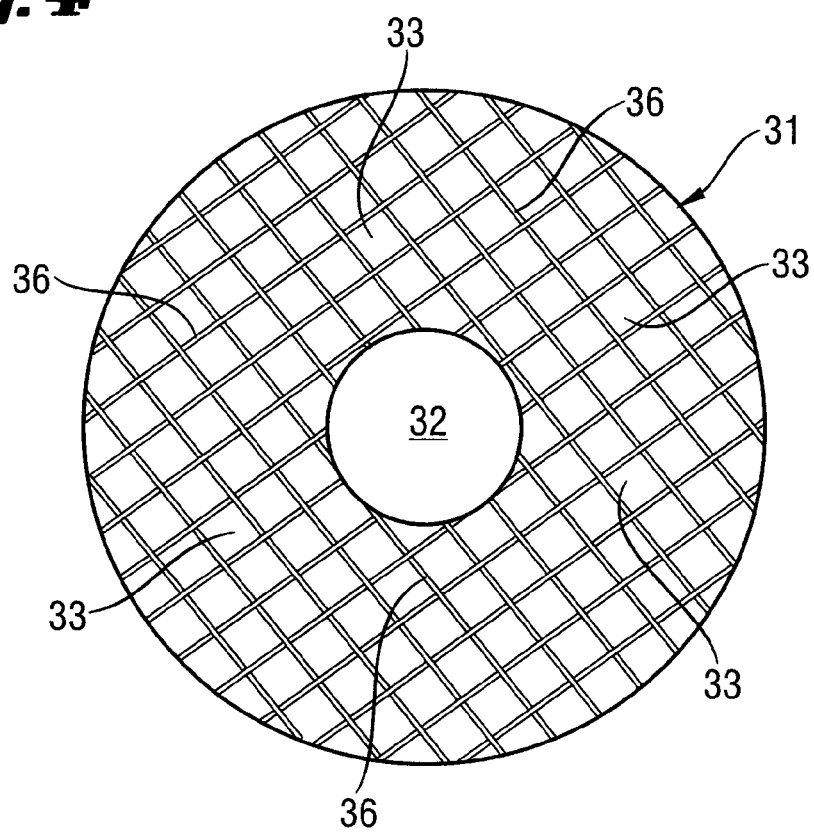
FIG. 4 shows a view of a second embodiment of the suction device along line II-II in FIG. 1.

The retaining element 31 shown in FIG. 4 is formed by a grating portion which has a through-opening 32 for the working tool and whose plurality of meshes 36 form suction openings 33.

Figure 5:
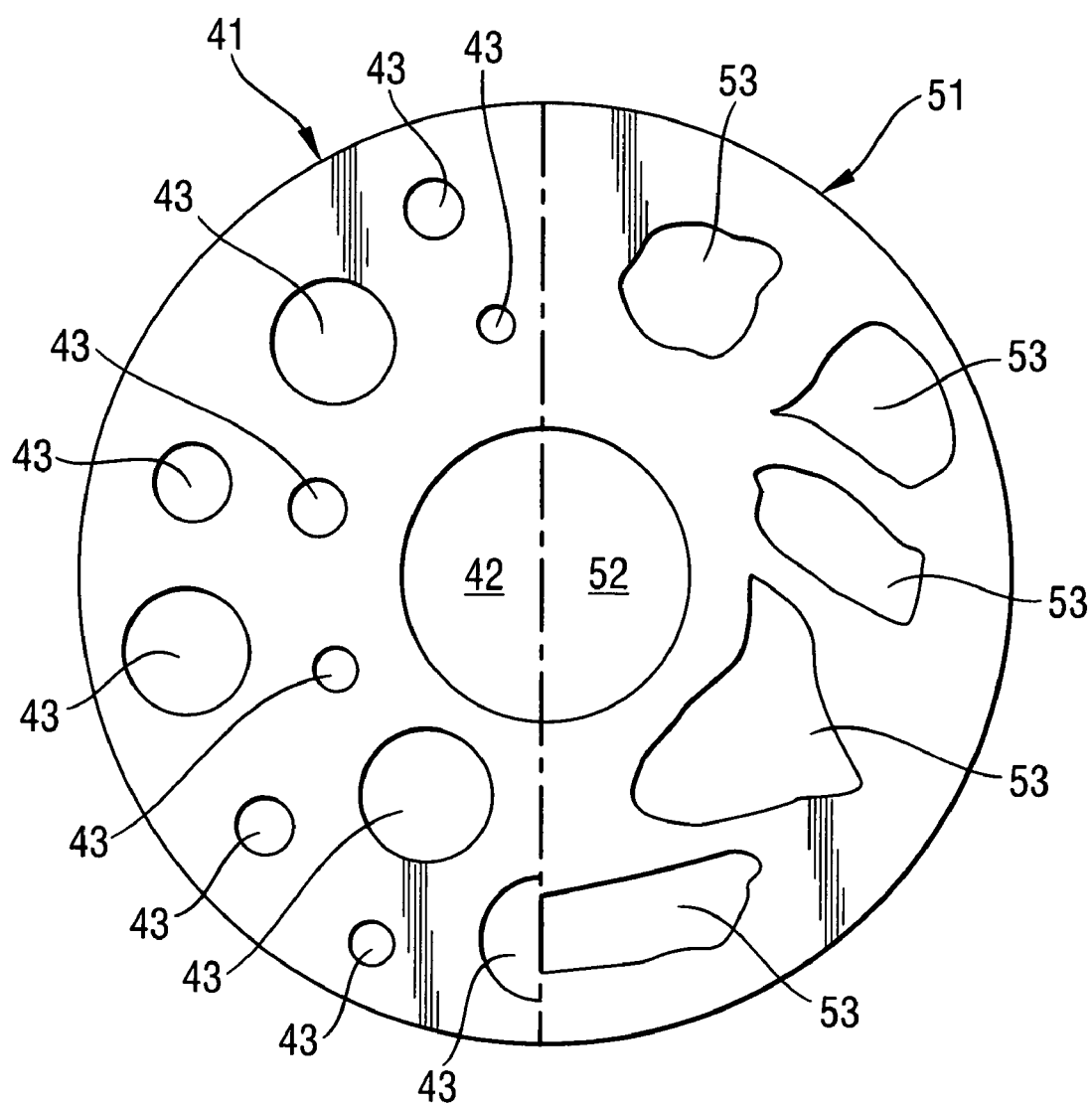
FIG. 5 shows a cross-sectional view of third (left half) and fourth (right half) embodiments of the suction device along line II-II in FIG. 1.

FIG. 5 shows two other constructions of retaining elements 41 and 51.

The retaining element 41 shown to the left of the dash-dot line with reference to the drawing is formed by a wall portion which has a through-opening 42 for the working tool and a plurality of suction openings 43, each of which has a circular cross section, but with different diameters. The suction openings 43 are circumferentially closed.

The retaining element 51 shown to the right of the dash-dot line with reference to the drawing is formed by a wall portion which has a through-opening 52 for the working tool and a plurality of suction openings 53 which have non-circular cross sections and are shaped differently. The suction openings 53 are also circumferentially closed.

Alternatively, suction openings 43 with circular cross sections and suction openings 53 with non-circular cross section could also be arranged, e.g., alternately or in respective groups, in a retaining element that is formed by a wall portion.

Figure 6:
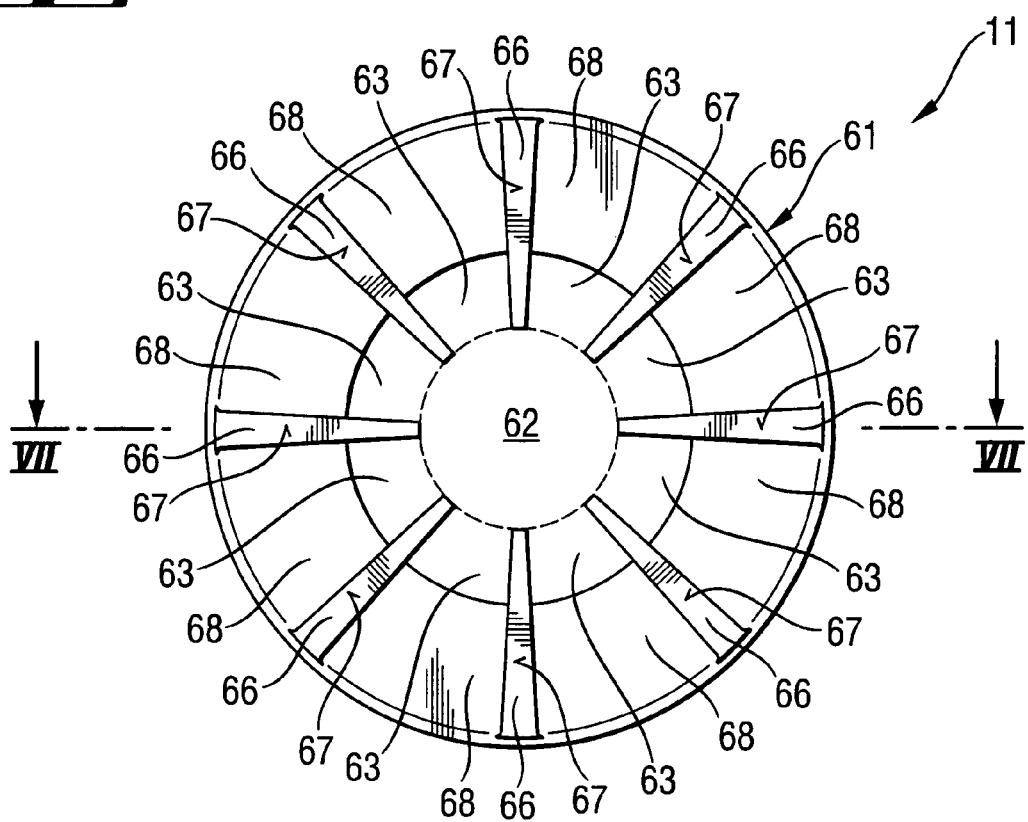
FIG. 6 shows a cross-sectional view of a fifth embodiment of the device along line II-II in FIG. 1.
Figure 7:
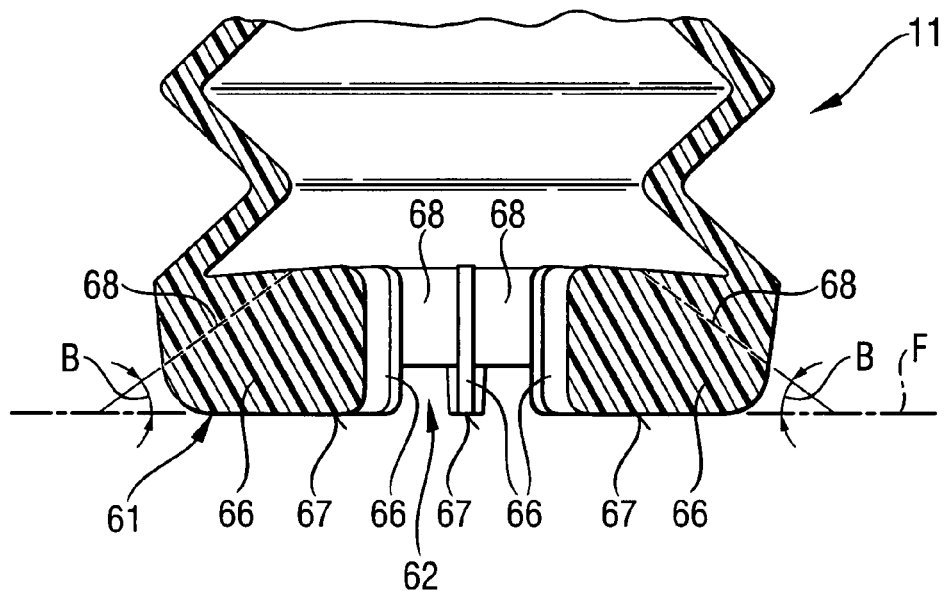
FIG. 7 shows a cross-sectional view along line VII-VII in FIG. 6.

The retaining element 61 shown in FIGS. 6 and 7 has a plurality of ribs 66 which are spaced apart and which extend from an outer circumference of the suction device 11 to the through-opening 62 for the working tool 7. Each of the ribs 66 has a contact edge 67 by which the suction device 11 contacts the constructional component. The contact edges 67 lie in a plane F. Wall portions 68 which extend from an outer circumference of the suction device 11 in direction of the through-opening 62 for the working tool 7 are provided between the ribs 66. Their free end is arranged at a distance from the through-opening 62 to create the suction openings 63. Further, the wall portions 68 are arranged at an angle B to the plane F by the contact edges 67.

All of the suction openings 23, 33, 43, 53, 63 have a minimum cross-sectional extension of greater than 2 mm and a maximum cross-sectional extension of less than 30 mm.

Though the present invention was shown and described with references to the preferred embodiments, such are merely illustrative of the present invention and is not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A suction device for a pick power tool (6), comprising a receiving space (20) which at least partially encloses a working tool (7) of the pick power tool (6); a securing device (14) provided at a first end (12) of the suction device (11) for securing the suction device (11) to the pick power tool (6); a contact area (15) provided at a second end (13) of the suction device (10) opposite the first end for contacting a constructional component, a connection device (18) for a vacuum source; and at least one retaining element (21; 31; 41; 51) having a through-opening (22; 32; 42; 52) for the working tool (7) and at least one suction opening (23; 33; 43; 53) provided in an area (19) of a second end (13) of the suction device (11) opposite the first end (12), wherein the retaining element (21) has a plurality of segments (26) extending from an outer circumference of the suction device (11) to the through-opening (22) for the working tool (7), wherein the segments (26) are arranged at a distance from one another to form the at least one suction opening (23), and wherein the segments (26) are trapezoidal in outline and are constructed so as to taper in direction of the through-opening (22).

2. A suction device according to claim 1, wherein the segments (26) are oriented at an angle (A) to a plane (B) by the second end (13) of the suction device (11), and extend from the second end (13) of the suction device (11) in direction of the first end (12) of the suction device (11).

3. A suction device according to claim 1, wherein the at least one suction opening (23; 33; 43; 53; 63) has a minimum cross-sectional extension greater than 2 mm.

4. A suction device according to of claim 1, wherein the at least one suction opening (23; 33; 43; 53; 63) has a maximum cross-sectional extension less than 30 mm.

5. A suction device for a pick power tool (6), comprising a receiving space (20) which at least partially encloses a working tool (7) of the pick power tool (6); a securing device (14) provided at a first end (12) of the suction device (11) for securing the suction device (11) to the pick power tool (6); a contact area (15) provided at a second end (13) of the suction device (10) opposite the first end for contacting a constructional component, a connection device (18) for a vacuum source; and at least one retaining element (21; 31; 41; 51) having a through-opening (22; 32; 42; 52) for the working tool (7) and at least one suction opening (23; 33; 43; 53) provided in an area (19) of a second end (13) of the suction device (11) opposite the first end (12), wherein the retaining element (31) is formed by a grating portion which has the through-opening (32) for the working tool and whose meshes (36) form the suction openings (33).

6. A suction device for a pick power tool (6), comprising a receiving space (20) which at least partially encloses a working tool (7) of the pick power tool (6); a securing device (14) provided at a first end (12) of the suction device (11) for securing the suction device (11) to the pick power tool (6); a contact area (15) provided at a second end (13) of the suction device (10) opposite the first end for contacting a constructional component, a connection device (18) for a vacuum source; and at least one retaining element (21; 31; 41; 51) having a through-opening (22; 32; 42; 52) for the working tool (7) and at least one suction opening (23; 33; 43; 53) provided in an area (19) of a second end (13) of the suction device (11) opposite the first end (12), wherein the retaining element (61) has a plurality of ribs (66) which are spaced apart from one another and extend from an outer circumference of the suction device (11) to the through-opening (62) for the working tool (7), wherein each of the ribs (66) has a contact edge (67) with which the suction device (11) contacts the constructional component, wherein the contact edges (67) lie in a plane (F).

\* \* \* \* \*